United States Patent [19]

Yamate

[11] Patent Number: 5,130,155
[45] Date of Patent: Jul. 14, 1992

[54] PROCESSED RAW EGG PRESERVABLE AT ROOM TEMPERATURE AND PROCESS THEREFOR

[76] Inventor: Masato Yamate, 612-2, Oaza-managura, Ekiya-cho, Fukuyama-shi, Hiroshima-ken, Japan

[21] Appl. No.: 606,068
[22] Filed: Oct. 30, 1990
[51] Int. Cl.$^5$ ............................................. A23B 5/08
[52] U.S. Cl. .................. 426/330.1; 426/614; 106/157; 106/158; 106/159
[58] Field of Search ............................ 426/330.1, 614; 106/157, 158, 159

[56] References Cited

U.S. PATENT DOCUMENTS

| | | | |
|---|---|---|---|
| 5,697 | 8/1908 | Guelpa | 106/157 |
| 904,035 | 11/1908 | Widgren | 106/157 |
| 1,456,494 | 5/1923 | Rowland | 106/157 |
| 2,089,063 | 8/1937 | Johnson | 106/157 |
| 2,216,338 | 8/1944 | DeLanglais | 106/159 |
| 2,369,766 | 2/1945 | Witty | 106/157 |
| 2,764,496 | 9/1956 | Vogel | 106/158 |
| 3,156,570 | 11/1964 | Holme | 426/330.1 |
| 3,479,195 | 11/1969 | Parkinson | 106/159 |
| 3,640,731 | 2/1972 | Kaplow | 426/330.1 |
| 5,052,448 | 7/1991 | Ros | 426/614 |

FOREIGN PATENT DOCUMENTS 63-98348 4/1988 Japan .............................. 426/330.1

OTHER PUBLICATIONS

Hescox 1979 Henley's Formulas for Home and Workshop pp. 18, 29 and 30 Avenel Books, N.Y.

*Primary Examiner*—Carolyn Paden
*Attorney, Agent, or Firm*—McAulay Fisher Nissen Goldberg & Kiel

[57] ABSTRACT

The processed raw egg preservable at room temperature according to the present invention is a uniformly kneaded paste like substance comprising 100 wt. parts of egg yolk or egg white, 1-10 wt. parts of a preservative, 5-20 wt. parts of a lower alcohol, and 1-6 wt. parts of an adhesive paste. The preservative prevents bacteria proliferation, the adhesive paste imparts an optimum viscosity, the lower alcohol uniformly disperses the component particles without separation or sedimentation, thereby maintaining the constant quality of the egg even when it is left standing at room temperature for more than a year.

6 Claims, No Drawings

1

PROCESSED RAW EGG PRESERVABLE AT ROOM TEMPERATURE AND PROCESS THEREFOR

BACKGROUND OF THE INVENTION

1) Field of the Invention

The present invention relates to processed raw egg which may be preserved for a long period of time at room temperature by separating the same into yolk and white, and the process therefor. More particularly, it relates to paste like processed raw eggs suitable for use as a print resist paste used at the time of dying textile products, a bleach inhibiting paste at the time of bleaching textile products or an adhesive paste or a primer for industrial products such as those made of wood, and the process therefor.

2) Description of the Related Art

When freshly laid eggs are left standing at room temperature, bacteria invade through air holes in the shell and proliferate on the nutrients, and the eggs undergo changes and become putrid in about 10 days.

In the prior art, freshly laid eggs in shells are immersed for 2 to 4 days and nights in a sterlized liquid seasoned with salt, sake-spirit, or soy sauce. As the seasoned liquid enters the egg through air holes in the shell, eggs can be stored at room temperature for a long period of time. Such a seasoned egg and the method of storing the same at room temperature over a long term were proposed in Japanese Patent Application laid open under Sho 60-164430.

Egg yolk or white of the egg processed according to the above mentioned method or raw eggs processed in the shell for extended storage tend to become putrid quickly once they are shelled even though yolks or whites are placed in a sealed container immediately after separation because bacteria tend to get mixed therein, thus making extended storage of fresh eggs extremely difficult.

SUMMARY OF THE INVENTION

An object of the present invention is to provide processed raw eggs that may be separated into yolk and white and stored for a long time at room temperature without heating or freezing and the process therefor.

Another object of the present invention is to provide paste-like processed raw eggs suitable for use as an adhesive paste or a primer for industrial products and the process therefor.

In order to achieve the above objects, the processed raw egg according to the present invention is a uniformly kneaded paste-like mixture comprising 100 wt. parts of egg yolk or egg white, 1-10 wt. parts of a preservative, 5-20 wt. parts of a lower alcohol, and 1-6 wt. parts of an adhesive paste.

The first processing method according to the present invention comprises the steps of uniformly mixing at room temperature under ambient pressure 1-10 wt. parts of a preservative, 5-20 wt. parts of a lower alcohol and 1-6 wt. parts of an adhesive paste as against 100 wt. parts of egg yolk or egg white to prepare a slurry, uniformly kneading the slurry with 100 wt. parts of either the egg yolk or the egg white, and preserving the egg yolk or the egg white in a paste form at room temperature.

The second processing method according to the present invention comprises uniformly kneading at room temperature under ambient pressure 100 wt. parts of egg yolk, 1-10 wt. parts of a preservative, 5-20 wt. parts of a lower alcohol, and 1-6 wts. parts of an adhesive, and preserving said egg yolk in a paste form at room temperature.

DESCRIPTION OF THE PREFERRED EMBODIMENTS

The eggs to be used in the present invention may be the eggs of any bird, including the larger ones with the diameter of 30 cm or longer and smaller ones with the diameter of ca. 1 cm. Because of the low price, availability in terms of quantity and processability, chicken eggs are preferable.

Freshly laid eggs are shelled and separated into the yolk and the white for the process. This separation is preferably conducted on an industrial scale using a known apparatus or tool.

One or more than two preservatives to be used in the present invention are selected from food preservatives such as sorbic acid, ortho-phenylphenol, sodium benzonate, salt, sugar, salicylic acid, dehydroacetic acid, and para-hydroxybenzoic ester. Particularly, sorbic acid, ortho-phenylphenol, sodium benzonate, salt and sugar are preferable for their low price and availability.

Methyl alcohol or ethyl alcohol is preferable as the lower alcohol for its high affinity to egg yolk or egg white, preservatives or adhesive pastes as well as for its disinfectant property.

Adhesive pastes are selected from cellulose derivatives such as carboxymethyl cellulose, methyl cellulose or hydroxyethyl cellulose. Because of their low price and availability, wheat flour or carboxymethyl cellulose is preferred. Either cake flour or bread flour may be used as the wheat flour depending on the uses of processed raw eggs.

The ratio of the preservative, lower alcohol and adhesive paste to be mixed is 1-10 wt. parts for preservative, 5-20 wt. parts for lower alcohol, and 1-6 wt. parts for adhesive paste as against 100 wt. parts of egg yolk or egg white. When the amount of preservative is less than 1 wt. part, the yolk or the white will easily become putrid, whereas if it exceeds 10 wt. parts, it becomes difficult to obtain a uniform paste of eggs. When the amount of lower alcohol is less than 5 wt. part, it becomes difficult to uniformly mix the preservative with the adhesive paste and obtain a slurry. On the other hand, if the amount exceeds 20 wt. parts, viscosity of the resultant egg solution becomes insufficient. The amount of lower alcohol should exceed the sum of the amount of preservative and that of adhesive paste to achieve the optimum viscosity of the resultant egg solution. If the amount of adhesive paste is less than 1 wt. part, it is difficult to obtain a uniformly mixed paste. On the other hand, if the amount exceeds 6 wt. parts, the viscosity becomes too high.

If the egg white alone is to be preserved, the mixture of preservative, lower alcohol and paste at the above mentioned ratio is first stirred at room temperature under ambient pressure in order to obtain a slurry in which component particles are uniformly dispersed without foaming of the egg white and to prevent separation of particles by the foams. The slurry was added with the egg white alone, and then uniformly kneaded with the egg white by a kneader.

When the egg yolk alone is to be preserved, a slurry is prepared by mixing a preservative, a lower alcohol and a paste, and the egg yolk is added and kneaded similarly in the slurry, or the preservative, lower alcohol, paste and egg yolk may be kneaded simultaneously since egg yolk does not foam when stirred.

The raw egg processed according to the above mentioned method is a paste-like substance having the same viscosity as the egg yolk or white when it is separated whether the substance primarily contains yolk or white.

Egg yolk or egg white uniformly kneaded with a preservative, a lower alcohol and an adhesive paste stays free of bacteria proliferation because of the preservative. The adhesive paste imparts a suitable viscosity to the substance while the lower alcohol disperses the component particles uniformly without separating or sedimenting the same to achieve a stable paste.

The processed raw egg according to the present invention may be kept standing at room temperature for more than a year without becoming putrid or rotten and keeps a constant quality. Because it keeps well at room temperature for a long period of time and does not require freezing/defreezing, it is most conveniently used. Its production and inventory controls are easily managed and the storage costs are extremely cheap.

As the principal component of the processed raw egg according to the present invention which is protein displays excellent properties in industrial products including textiles and wood works such as wettability, adhesiveness, print resistability, and water resistance, the paste-like raw egg according to the present invention may be most advantageously used as the print resist paste in dying of the textile products, as the bleach inhibiting paste in bleaching the textile products, or as the adhesive paste or primer for wooden products and other industrial products.

The present invention will now be described in more detail by way of examples.

EXAMPLE 1

Five hundred grams of powdered preservative mainly containing sorbic acid and ortho-phenylphenol (Commercial name: SPP, Ueno Pharmaceuticals), 500 g of disinfectant ethyl alcohol and 200 g of carboxylmethyl cellulose (Abbreviation: CMC, Daicel Chemical Ind.) are agitated at 20° C. under ambient pressure into a slurry using a large size blender for home use. To the resultant slurry is charged 10 kg of egg yolks separated from the egg white by an egg white-yolk separator for chicken eggs, and the mixture is further agitated thoroughly in the blender for professional confectionery use (Fujii Kaki Co.) at 20° C. under ambient pressure to obtain paste-like raw egg.

When the raw eggs processed according to the present invention were placed in a plastic bag and left standing at room temperature under ambient pressure in a room without air conditioning for 13 months, the eggs did not become putrid or undergo changes.

The above-mentioned egg was taken out of the bag after storage for 13 months at room temperature and used as a bleach inhibiting paste. Using a painting brush impregnated well with the processed egg, a flowery pattern was painted on an apparel product made of denim which was yarn-dyed with indigo dye. After drying with air the processed egg painted on the cloth, the cloth was placed in a rotary print washing machine with pumice stones which had been immersed with aqueous solution of calcium hypochlorine of 12% available chlorine. By rotating the washing machine in both directions at 30 rpm for 15 minutes, the cloth was bleached. The bleaching solution was removed from the machine, and the cloth was washed of the bleaching agent and processed egg with water. When the cloth was dried, the denim material was discolored by friction with the pumice stones which were impregnated with bleaching agent in a marble fashion except for the flowery pattern which was painted with the processed egg. The flowery pattern, however, retained vivid indigo colored pattern.

EXAMPLE 2

Three hundred grams of cake flour was added with a preservative containing 300 g of sodium benzonate and 1000 g of methyl alcohol, and agitated thoroughtly at 20° C. under ambient pressure using a large sized blender for home use. A uniformly mixed slurry was obtained. Ten kilograms of egg white separated from chicken eggs by a separator was charged into the slurry, and kneaded well at 20° C. under ambient pressure using a blender for professional confectionary use (Fujii Kaki Co.) to obtain paste-like processed raw egg.

When the raw eggs processed according to the present invention were placed in a plastic bag and left standing at room temperature under ambient pressure in a room without any air conditioning for 13 months, the egg did not become putrid or undergo changes.

The above mentioned egg was taken out of the bag after storage for 13 months at room temperature, and used as a primer for wood products. Using brush impregnated well with this processed eggs, the substance was uniformly applied over the entire surfaces of a plurality of lauan plates cut respectively into the width of 7 cm and the length of 30 cm to be put together and used for a dining table top. After the plates were air-dried, the entire surface of the lauan pieces was ground with fine grain sand paper. The lauan plates were then assembled to from a table top, and coated with varnish. The lauan table top coated with the processed egg manifested little warps or dimensional errors, thereby remarkably decreasing the work involved in adjusting dimensions at the time of assembly. When the processed egg is used as a primer, varnish adhered well and a fine quality finish was obtained.

What is claimed is:

1. A processed room temperature preserved raw egg comprising 100 parts by weight of egg yolk, 1 to 10 parts of a preservative, 5 to 20 parts by weight of a lower alcohol, and 1 to 6 parts by weight of an adhesive paste, all of which components are uniformly kneaded in a paste form.

2. A process for preserving egg yolk in a paste form at room temperature by uniformly kneading 100 wt. parts of yolk, 1–10 wt. parts of a preservative, 5–20 wt. parts of lower alcohol and 1–6 wt. parts of an adhesive paste at room temperature under ambient pressure.

3. A process for preserving a paste of egg yolk at room temperature comprising preparing a slurry by uniformly mixing a preservative, a lower alcohol, and an adhesive paste at room temperature and ambient pressure and then uniformly kneading the slurry with egg yolk, the amount of each component per 100 parts by weight of egg yolk being:
   1 to 10 parts by weight of preservative;
   5 to 20 parts by weight of lower alcohol; and
   1 to 6 parts by weight of adhesive paste.

4. The process of claim 3 or 2 wherein one or more preservatives are selected from sorbic acid, ortho-phenylphenol, sodium benzonate, salt or sugar.

5. The process of claim 3 or 2 wherein the lower alcohol is methyl alcohol or ethy alcohol.

6. The process of claim 3 or 2 wherein the adhesive paste is wheat flour or carboxylmethyl cellulose.

* * * * *